US010434549B1

(12) United States Patent
McConnell

(10) Patent No.: US 10,434,549 B1
(45) Date of Patent: Oct. 8, 2019

(54) TEMPORARY TRANSFER STATIONS

(71) Applicant: John M. McConnell, LaGrange, GA (US)

(72) Inventor: John M. McConnell, LaGrange, GA (US)

( * ) Notice: Subject to any disclaimer, the term of this patent is extended or adjusted under 35 U.S.C. 154(b) by 0 days.

(21) Appl. No.: 16/392,073

(22) Filed: Apr. 23, 2019

Related U.S. Application Data

(62) Division of application No. 16/207,565, filed on Dec. 3, 2018, now Pat. No. 10,307,804.

(51) Int. Cl.
| | |
|---|---|
| *B09B 1/00* | (2006.01) |
| *E01C 11/00* | (2006.01) |
| *B65F 9/00* | (2006.01) |
| *E01C 3/00* | (2006.01) |
| *E01C 23/12* | (2006.01) |
| *E01C 9/08* | (2006.01) |

(52) U.S. Cl.
CPC ................. *B09B 1/00* (2013.01); *B65F 9/00* (2013.01); *E01C 3/00* (2013.01); *E01C 9/08* (2013.01); *E01C 11/00* (2013.01); *E01C 23/12* (2013.01); *E01C 2201/20* (2013.01)

(58) Field of Classification Search
CPC ..................................... B09B 1/00; B65F 9/00
See application file for complete search history.

(56) References Cited

U.S. PATENT DOCUMENTS

| | | | | |
|---|---|---|---|---|
| 2,644,790 A | * | 7/1953 | Harper | C02F 11/16 210/150 |
| 4,252,462 A | | 2/1981 | Klingle et al. | |
| 4,457,646 A | * | 7/1984 | Laesch | E02B 11/00 405/36 |
| 5,056,960 A | * | 10/1991 | Marienfeld | B09B 1/00 405/129.6 |
| 5,273,373 A | * | 12/1993 | Pouyer | E01C 9/086 404/35 |
| 5,447,389 A | * | 9/1995 | Olson | E02D 27/35 405/129.7 |
| 5,513,928 A | * | 5/1996 | Eryou | E01C 9/00 210/170.01 |
| 6,106,197 A | * | 8/2000 | Kozak | C05F 17/0045 241/DIG. 38 |
| 6,461,424 B1 | * | 10/2002 | Ramme | C04B 18/08 106/709 |
| 9,675,907 B2 | * | 6/2017 | Deskins | C05F 7/00 |
| 2004/0253055 A1 | * | 12/2004 | Polivka, Jr. | E01C 9/086 405/43 |
| 2007/0031192 A1 | * | 2/2007 | Murfin | E03F 1/002 405/43 |
| 2009/0142542 A1 | * | 6/2009 | Halahmi | E02D 17/20 428/116 |

(Continued)

*Primary Examiner* — Janine M Kreck
(74) *Attorney, Agent, or Firm* — R. Keith Harrison

(57) ABSTRACT

Temporary transfer stations for facilitating distribution of debris from at least one damaged area to at least one landfill may include at least one excavatable transfer station slab. The at least one transfer station slab may include at least one waterproof layer. At least one layer support frame may be provided on the at least one waterproof layer. At least one debris support layer may be provided on the at least one layer support frame. The at least one debris support layer may have at least one controlled low strength material.

18 Claims, 15 Drawing Sheets

(56) References Cited

U.S. PATENT DOCUMENTS

| | | | |
|---|---|---|---|
| 2011/0211908 A1* | 9/2011 | Krzyzak | E01C 1/002 |
| | | | 404/70 |
| 2013/0170907 A1* | 7/2013 | Gunn | E01C 9/08 |
| | | | 404/36 |
| 2014/0270982 A1* | 9/2014 | Munro | E02D 3/005 |
| | | | 405/258.1 |

* cited by examiner

TEMPORARY TRANSFER STATIONS

CROSS-REFERENCE TO RELATED APPLICATIONS

This is a divisional of parent U.S. patent application Ser. No. 16/207,565, filed Dec. 3, 2018 and entitled TEMPORARY TRANSFER STATIONS AND METHODS OF FABRICATION AND USE THEREOF, which parent application is hereby incorporated by reference herein in its entirety.

FIELD

Illustrative embodiments of the disclosure generally relate to transfer stations which facilitate timely, orderly and efficient distribution of debris from damaged areas, such as areas affected by natural disasters, to landfills. More particularly, illustrative embodiments of the disclosure relate to temporary transfer stations and methods of fabricating temporary transfer stations which can be fabricated and deployed in place at transfer station sites for use and removed from the sites after use without any environmental impact.

SUMMARY

Illustrative embodiments of the disclosure are generally directed to temporary transfer stations for facilitating distribution of debris from at least one damaged area to at least one landfill. An illustrative embodiment of the temporary transfer stations may include at least one transfer station slab having at least one waterproof layer. At least one layer support frame may be provided on the at least one waterproof layer. At least one debris support layer may be provided on the at least one layer support frame. The at least one debris support layer may have at least one controlled low strength material.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
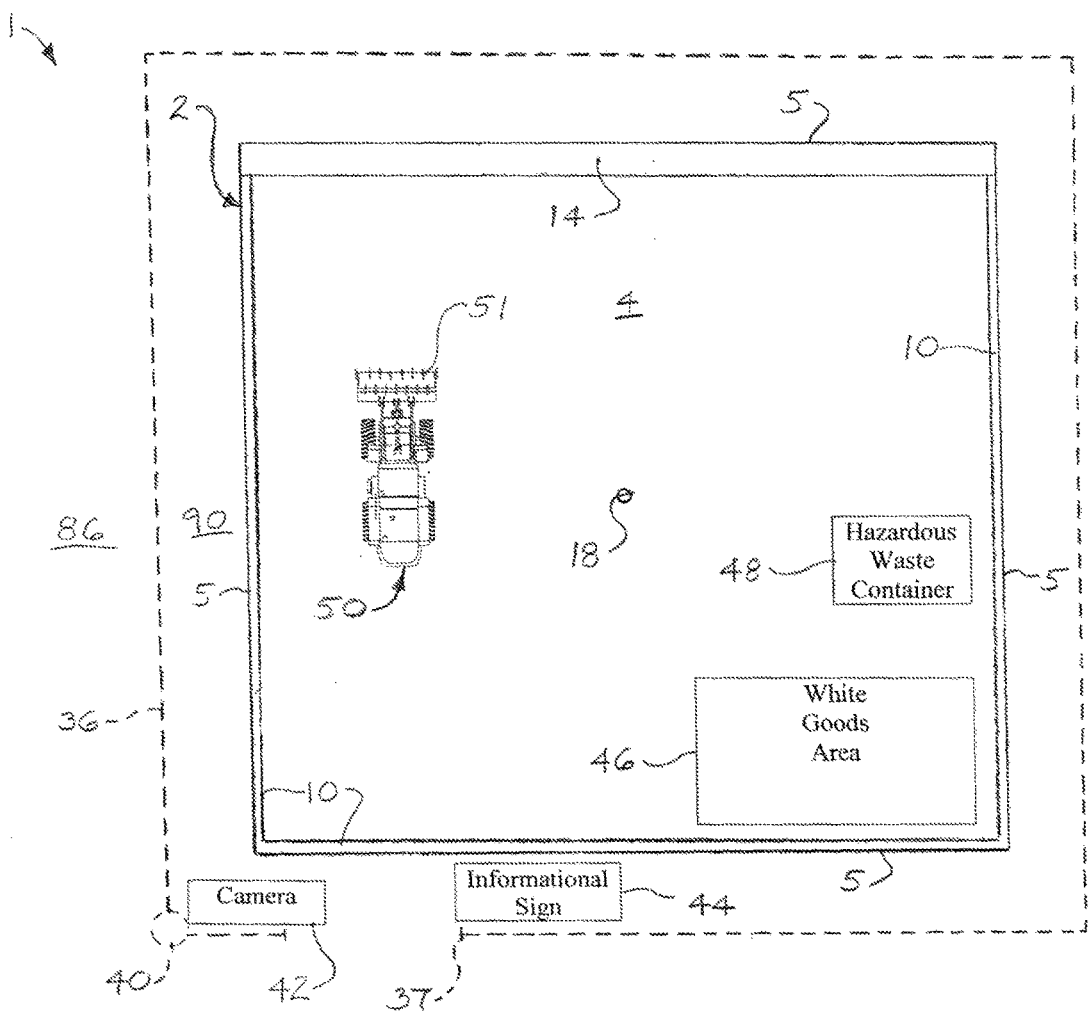
FIG. 1 is a top view of a typical layout for a temporary transfer station according to some illustrative embodiments of the temporary transfer stations and methods of fabrication and use thereof, with the temporary transfer station deployed in place on the ground at a transfer station site.
Figure 2:
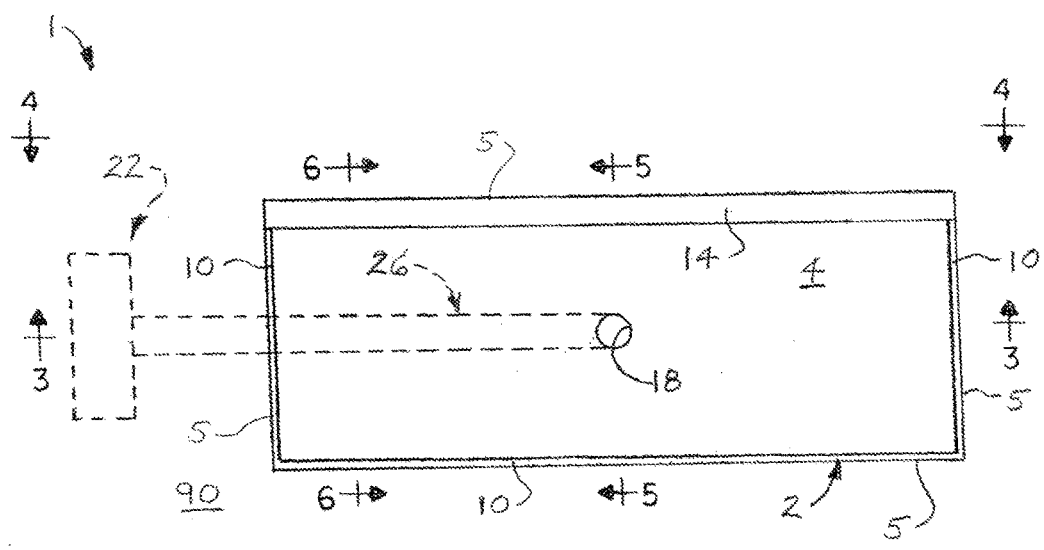
FIG. 2 is a top view of a typical temporary transfer station according to some illustrative embodiments of the temporary transfer stations and methods of fabrication and use thereof.
Figure 20:
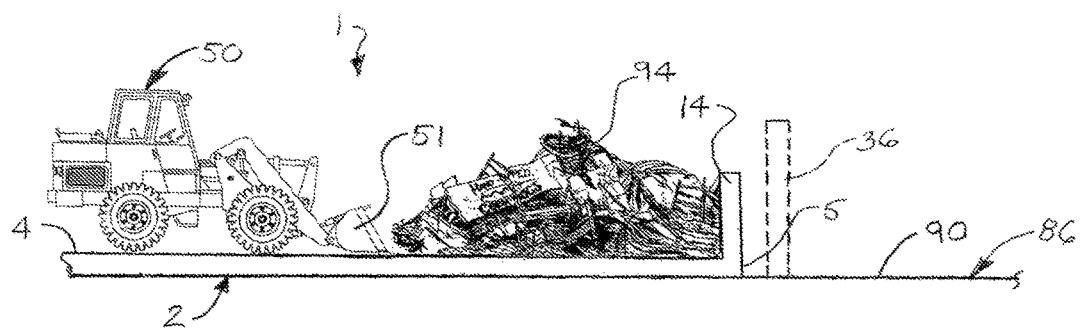
FIG. 20 is a side view of a portion of a typical temporary transfer station, with debris on the transfer station slab and a skid steer preparing to remove the debris from the transfer station slab in typical application of some illustrative embodiments of the temporary transfer stations and methods of fabrication and use thereof.
Figure 21:
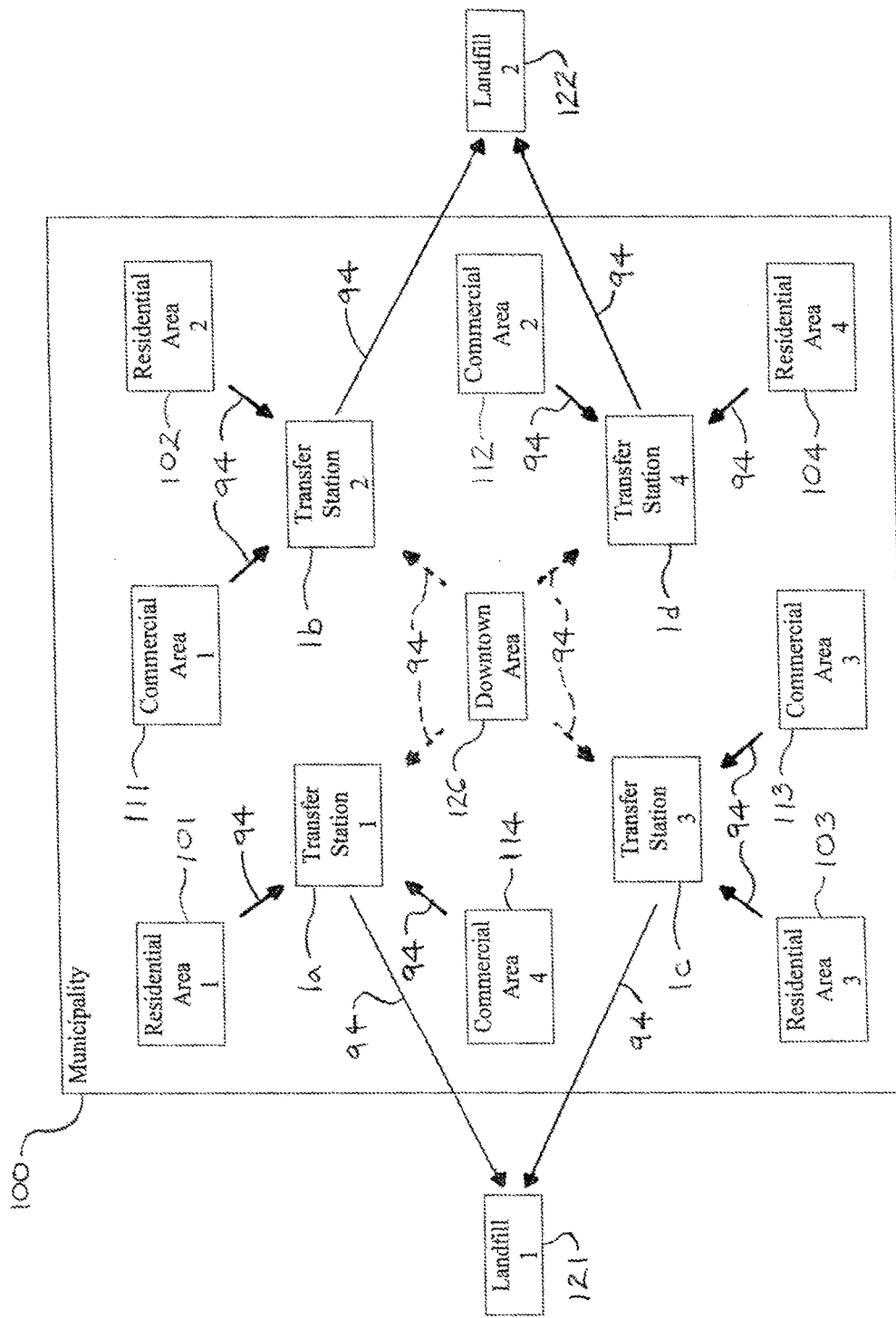
FIG. 21 is a schematic diagram of a typical geographical area in the form of a municipality with multiple temporary transfer stations deployed at selected locations within the geographical area, more particularly illustrating typical distribution of debris from damaged areas in the geographical area to the temporary transfer stations and from the temporary transfer stations to landfills according to sonic illustrative embodiments of the temporary transfer stations and methods of fabrication and use thereof.

Referring initially to FIGS. 1, 20 and 21 of the drawings, a typical temporary transfer station according to some illustrative embodiments of the temporary transfer stations and methods of fabrication and use thereof is generally indicated by reference numeral 1. As illustrated in FIG. 21, in some applications, which will be hereinafter further described, at least one temporary transfer station 1a-1d may be fabricated and deployed on at least one transfer station site 86 (FIG. 1) in at least one geographical area 100. In some applications, the geographical area 100 may include at least one municipality having at least one residential area 101, 102, 103 and 104, respectively, and/or at least one commercial area 111, 112, 113 and 114, respectively. A downtown area 126 may be centrally-located relative to the residential areas 101, 102, 103 and 104 and the commercial areas 111, 112, 113 and 114. At least one landfill 121, 122 may serve the waste disposal requirements of the geographical area 100. In other applications, the geographical area 100 may include at least one rural area. In still other applications, the geographical area 100 may include at least one rural area and at least one municipality.

In the event of a natural disaster such as an earthquake, tornado, hurricane and/or flood, for example and without limitation, the geographical area 100 may have at least one damaged area in one or more of the residential areas 101, 102, 103 and 104, the commercial areas 111, 112, 113 and 114, and the downtown area 126. Accordingly, at least one temporary transfer station 1a-1d may be deployed on at least one corresponding transfer station site 86 in the geographical area 100. Debris 94 (FIG. 20) may be distributed from the damaged area or areas to each temporary transfer station 1a-1d which is within proximity to the damaged area, and then from the temporary transfer station 1a-1d to one of the landfills 121, 122. The temporary transfer stations 1a-1d may therefore facilitate timely, orderly and efficient distribution of the debris 94 from the damaged areas to the landfills 121 in cleanup of the geographical area 100 preparatory to subsequent rebuilding. After use, the temporary transfer stations 1a-1d may be removed from the respective transfer station sites 86 without any environmental impact to the geographical area 100.

Figure 3:
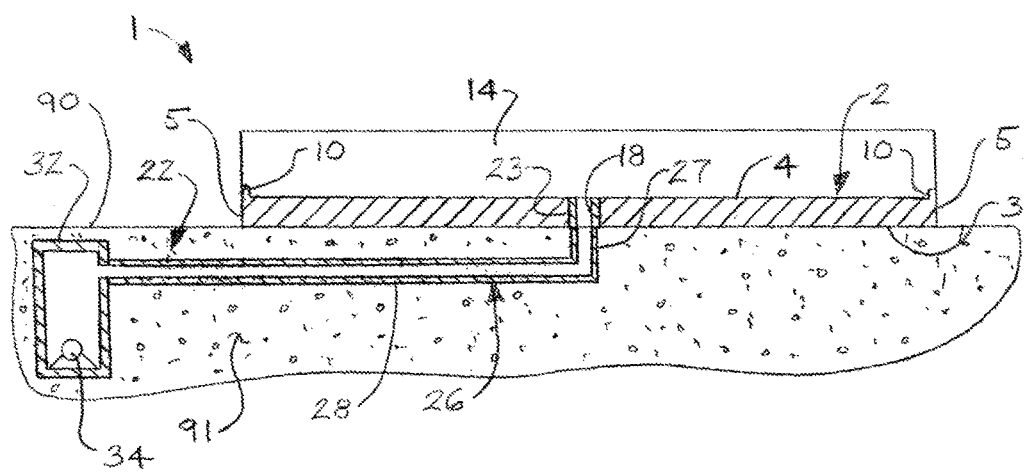
FIG. 3 is a longitudinal sectional view, taken along section lines 3-3 in FIG. 2, of the illustrative temporary transfer station.
Figure 4:
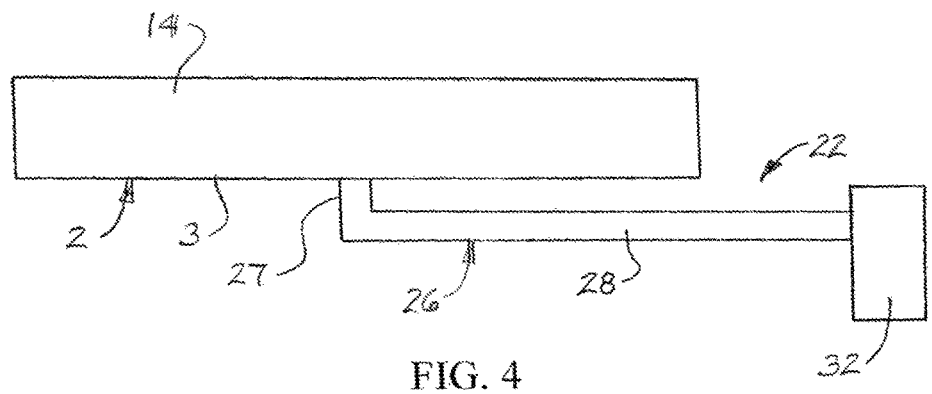
FIG. 4 is a side view, taken along viewing lines 4-4 in FIG. 2, of the illustrative temporary transfer station.
Figure 5:
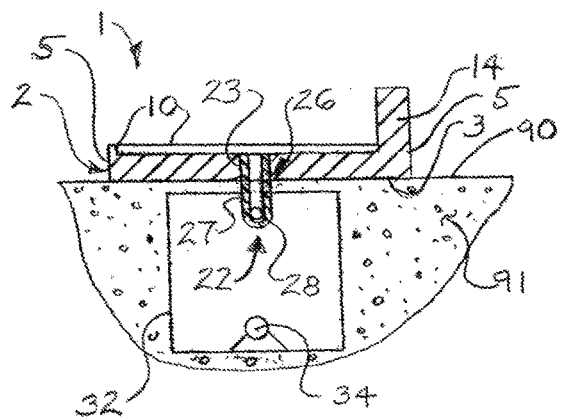
FIG. 5 is a cross-sectional view, taken along section lines 5-5 in FIG. 2, of the illustrative temporary transfer station.
Figure 6:
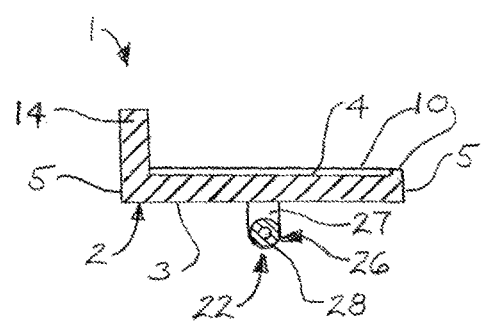
FIG. 6 is a cross-sectional view, taken along section lines 6-6 in FIG. 2, of the illustrative temporary transfer station.
Figure 7:
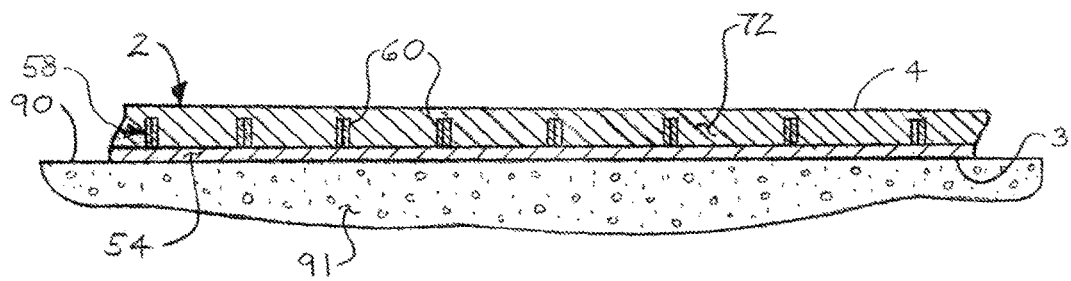
FIG. 7 is a sectional view of a portion of the transfer station stab of a typical temporary transfer station according to some illustrative embodiments of the temporary transfer stations and methods of fabrication and use thereof.
Figure 8:
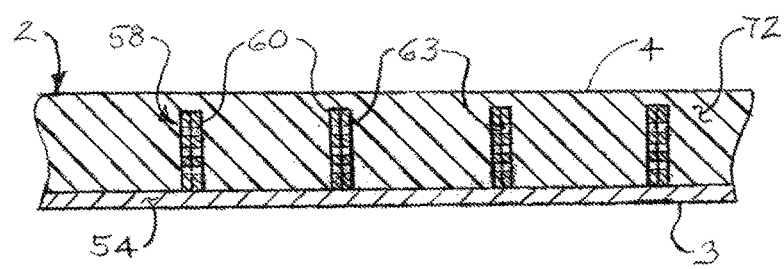
FIG. 8 is an enlarged cross-sectional view of the transfer station slab illustrated in FIG. 7.

Referring next to FIGS. 1-11 of the drawings, each temporary transfer station 1 may include at least one transfer station slab 2. As illustrated in FIGS. 3-8, the transfer station slab 2 may have a bottom slab surface 3, a top slab surface 4 and at least one side slab surface 5. The top slab surface 4 may be suitable for supporting the debris 94 (FIG. 20) placed on the transfer station slab 2. As illustrated in FIGS. 3, 5 and 6, the bottom slab surface 3 may rest on the ground 90 at the transfer station site 86. At least one slab lip 10 may protrude from the top slab surface 4. The slab lip 10 may follow the perimeter of the transfer station slab 2 at the side slab surface or surfaces 5. In some embodiments, at least one push wall 14 may extend from the top slab surface 4 typically along at least one of the side slab surfaces 5 for purposes which will be hereinafter described. In some embodiments, the slab lip 10 may be about 2 inches in height and the push wall 14 may be about 2 feet in height, although these dimensions may vary depending on the application.

In some embodiments, at least one drain opening 18 may extend through the transfer station slab 2. At least one drainage system 22 may be disposed in fluid communication with the drain opening 18. In some embodiments, the drainage system 22 may be buried in the soil 91 beneath the transfer station slab 2. As illustrated in FIG. 3, a drain sleeve 23 may extend through the transfer station slab 2 in or in fluid communication with the drain opening 18. Accordingly, liquid (not illustrated) from the debris 94 may be drained from the top slab surface 4 of the transfer station slab 2 through the drain opening 18 and the drain sleeve 23 and into the drainage system 22. The slab lip 10 may confine the liquid to the top slab surface 4 and prevent runoff of the liquid from the transfer station slab 2 onto the adjacent ground 90.

In some embodiments, the drainage system 22 may include at least one drain conduit 26 disposed in fluid communication with the drain sleeve 23. At least one holding tank 32 may be disposed in fluid communication with the drain conduit 26. In some embodiments, the holding tank 32 may be double-, triple- or otherwise multi-walled. At least one pump 34 may be provided in the drainage system 22 to facilitate pumping of liquid drained from the top slab surface 4 through the drain conduit 26 into the holding tank 32. As illustrated in FIGS. 3 and 4, in some embodiments, the drain conduit 26 may include a vertical proximal conduit segment 27 which may communicate with the drain sleeve 23. A horizontal distal conduit segment 28 may extend from the proximal conduit segment 27 to the holding tank 32.

As illustrated in FIG. 1, in some applications, at least one fence 36 may be erected on the ground 90 around the transfer station slab 2. At least one access gate 37 may be provided in the fence 36. The access gate 37 may facilitate access of dump trucks and/or other debris-carrying vehicles (not illustrated) in transfer of the debris 94 from the vehicle onto the top slab surface 4 of the transfer station slab 2 after transport of the debris 94 from the damaged area to the temporary transfer station 1, as well as subsequent transfer of the debris 94 from the temporary transfer station 1 onto the vehicle for transport of the debris 94 to the landfill 121, 122. At least one informational sign 44 may be provided on or inside the fence 36. In some applications, the informational sign 44 may be provided on a trailer (not illustrated) which may be positioned on or adjacent to the transfer station slab 2 inside the fence 36. The informational sign 44 may display such information as the types of debris 94 which the temporary transfer station 1 will accept, the operating hours of the temporary transfer station 1, etc. In some applications, the informational sign 44 may indicate that hazardous wastes are not accepted at the temporary transfer station 1.

At least one white goods area 46 may be provided on the top slab surface 4 of the transfer station slab 2. The white goods area 46 may accommodate white goods such as household appliances and the like. At least one hazardous waste container 48 may be provided on the top slab surface 4 of the transfer slab 2. The hazardous waste container 48 may accept and contain hazardous wastes.

At least one skid steer 50 may be provided on the top slab surface 4. The skid steer 50 may have a skid steer bucket 51 which facilitates unloading of the debris 94 from the top slab surface 4 of the transfer station slab 2 onto the dump truck or other suitable vehicle (not illustrated) for transport of the debris 94 to the landfill 121, 122, as will be hereinafter further described.

As further illustrated in FIG. 1, in some applications, at least one camera 42 may be provided on at least one camera post 40. The camera post 40 may be provided at a corner or elsewhere of the fence 36. The camera 42 may facilitate surveillance of the temporary transfer station 1 typically during operation of the temporary transfer station 1.

As illustrated in FIGS. 7-11 of the drawings, in some embodiments, the transfer station slab 2 may include at least one waterproof layer 54. The waterproof layer 54 may include any type of plastic, rubber and/or other polymeric material which is substantially impervious to liquid. At least one layer support frame 58 may be provided on the waterproof layer 54. At least one debris support layer 72 may be provided on the layer support frame 58. The bottom slab surface 3 may correspond to the lower surface and the top slab surface 4 may correspond to the upper surface of the transfer station slab 2. The side slab surface 5 may correspond to the outer edge or surface of the debris support layer 72.

In some embodiments, the debris support layer 72 may include at least one controlled low strength material 73 (FIG. 9C) such as flowable fill, for example and without limitation. The controlled low strength material 73 may include a mixture of Portland cement, water and aggregate material and may include fly ash. The controlled low strength material 73 may be fabricated using formulation parameters and concentrations of constituents which enable later excavation of the transfer station slab 2 typically using backhoes, earth-moving equipment, skid steers or the like, according to the knowledge of those skilled in the art. Accordingly, the removable or excavatable controlled low strength material 73 may have a compressive strength range of from about 30 psi to about 200 psi to facilitate later excavation and removal of the transfer station slab 2 from the transfer station site 86 after use of the temporary transfer station 1. Flowable fill can be obtained at www.flowablefill.com.

The layer support frame 58 may include any type of structure or combination of structures capable of supporting and reinforcing the debris support layer 72 in the transfer station slab 2. In some embodiments, the layer support frame 58 may include a cellular confinement system having interconnected system cells 62. A non-limiting example of a cellular confinement system which is suitable for use as the layer support frame 58 includes the GEOWEB® Geocells available from Presto Geosystems of Appleton. Wis. (www.prestogeo.com). The cellular confinement systems are typically available in heights of 4", 6" or 8".

Figure 9A:
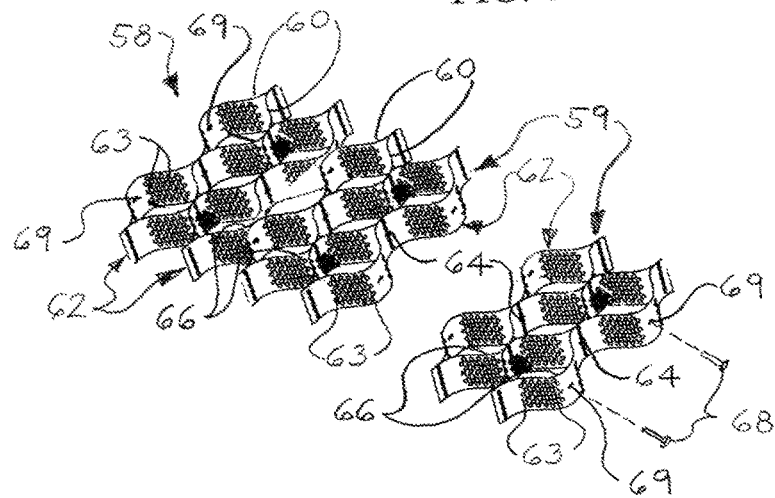
FIG. 9A is an exploded perspective view of a typical cellular confinement system suitable for fabrication of a layer support frame of the transfer station slab according to some illustrative embodiments of the temporary transfer stations and methods of fabrication and use thereof.
Figure 9B:
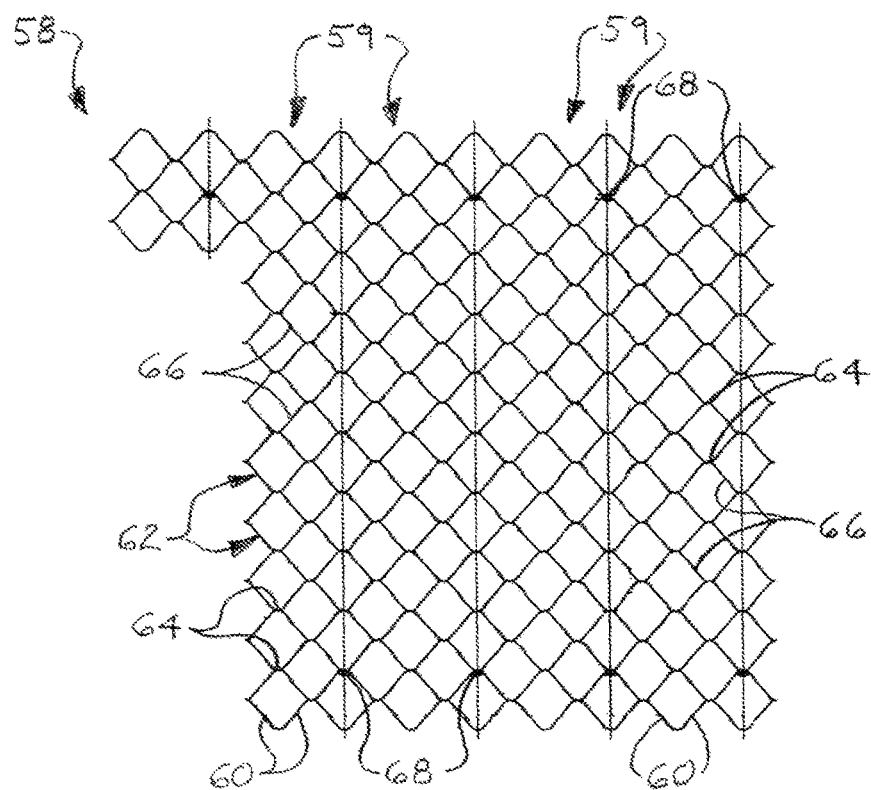
FIG. 9B is a top view of the typical cellular confinement system illustrating multiple system sections attached to each other.

As illustrated in FIG. 9A, the cellular confinement system of the layer support frame 58 may include a plurality of adjacent system sections 59. Each system section 59 may include a series of elongated, adjacent, undulating system strips 60. The undulating segments of each pair of adjacent system strips 60 may form complementary portions of each system cell 62, with the system strips 60 forming the respective walls of the system cell 62. Strip fasteners 64 may attach the adjacent system strips 60 to each other to form each system section 59. Section fasteners 68 may be extended through registering section fastener openings 69 in the system strips 60 of different system sections 59 to fasten the adjacent system sections 59 to each other and form a layer support frame 58 having a desired size and shape, as illustrated in FIG. 9B.

Figure 9C:
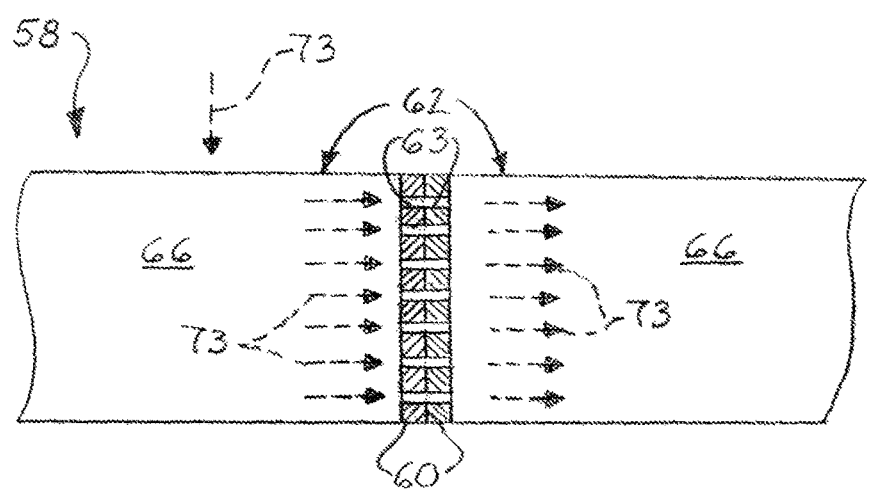
FIG. 9C is a sectional view of a pair of interconnected system cells in the cellular confinement system, more particularly illustrating typical pouring of a controlled low strength material into the system cells and flow of the material among the cells in typical fabrication of a debris support layer according to some illustrative embodiments of the temporary transfer stations and methods of fabrication and use thereof.
Figure 10:
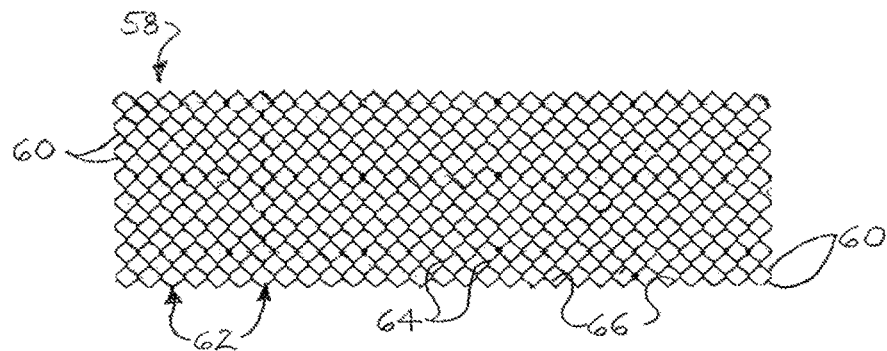
FIG. 10 is a top view of a typical cellular confinement system of the layer support frame in the transfer station slab according to some illustrative embodiments of the temporary transfer stations and methods of fabrication and use thereof.

Each system cell 62 may have a cell interior 66. A series of cell openings 63 which communicate with the cell interior 66 may extend through each system strip 60. Accordingly, in typical fabrication of the debris support layer 72, as illustrated in FIG. 9C and will be hereinafter further described, the liquid controlled low strength material 73 may be dispensed into the cell interiors 66 of the system cells 62. The controlled low strength material 73 may flow among the cell interiors 66 of the system cells 62 through the cell openings 63 in the system strips 60 which form the walls of each system cell 62 to equalize distribution of the controlled strength material 73 across the length and width of the debris support layer 72 prior to hardening or curing of the controlled low strength material 73.

Figure 11:
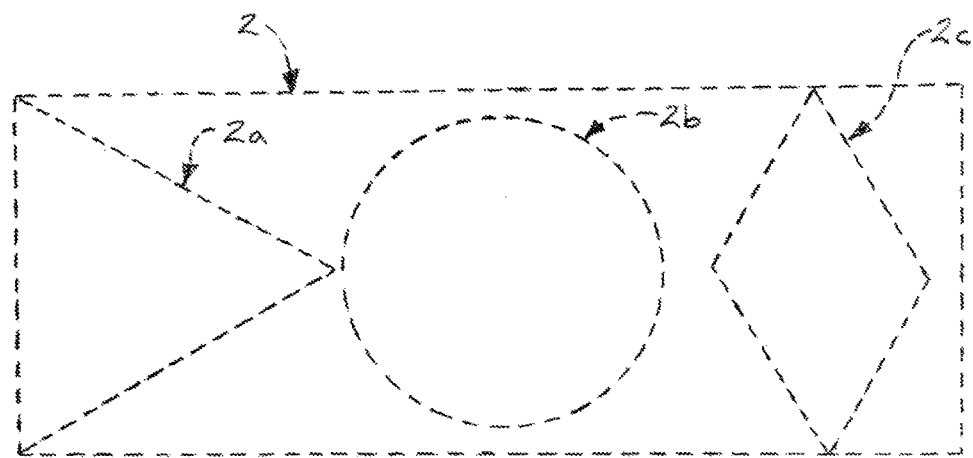
FIG. 11 is a top view of a typical transfer station slab according to some illustrative embodiments of the temporary transfer stations and methods of fabrication and use thereof, more particularly various possible shapes and sizes for the transfer station slab.

As illustrated in FIG. 11, it will be appreciated by those skilled in the art that the transfer station slab 2 of the temporary transfer station 1 is highly-customizable in size and shape to accommodate different applications and constraints depending on the spatial demands or requirements of the transfer station site 86 and other requirements. The transfer station slab 2 may be fabricated in any desired size and shape. For example and without limitation, in some embodiments, the transfer station slab 2 may be elongated and rectangular. In other embodiments, the transfer station slab 2a be triangular. In still other embodiments, the transfer station slab 2b may be circular. In yet other embodiments, the transfer station slab 2c may be diamond-shaped. In other embodiments, the transfer station slab 2 may have other polygonal or non-polygonal shapes. The layer support frame 58 may be fabricated in various sizes, and shapes typically by fabricating or assembling and/or cutting the system sections 59 which are used to fabricate the layer support frame 58 into the desired sizes and shapes to form the overall desired size and shape of the transfer station slab 2. In some non-limiting embodiments, the transfer station slab 2 may have an elongated rectangular shape with a size ranging from about 40 ft.×60 ft. to about 100 ft.×200 ft. In other embodiments, the transfer station slab 2 may have the same or different shapes with larger or smaller dimensions.

Figure 12:
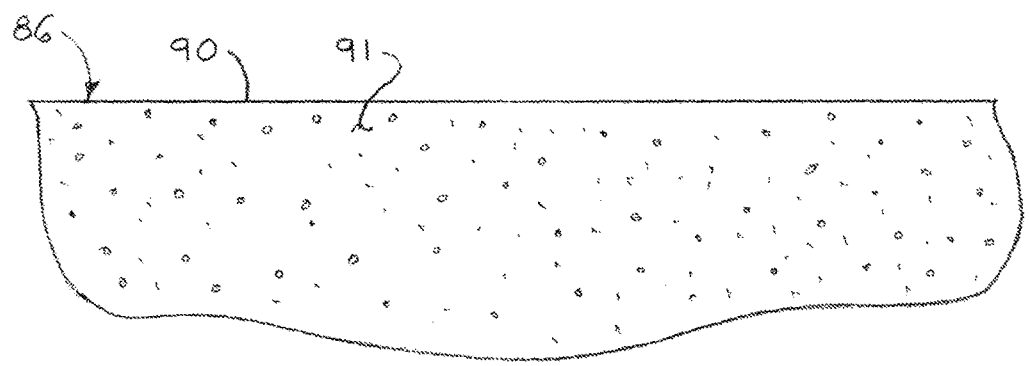
FIGS. 12-19 are longitudinal sectional views illustrating typical sequential fabrication of a temporary transfer station at a transfer station site according to some illustrative embodiments of the temporary transfer stations and methods of fabrication and use thereof.

Referring next to FIGS. 12-19 of the drawings, longitudinal sectional views illustrating typical sequential fabrication of a temporary transfer station 1 at a transfer station site 86 according to some illustrative embodiments of the temporary transfer stations and methods of fabrication and use thereof are illustrated. As illustrated in FIG. 12, each transfer station site 86 may initially be identified and located for deployment of the temporary transfer station 1. Preliminary soil samples may be obtained from the soil 91 at the transfer station site 86 and tested to determine the presence of contaminants in the soil 91 beneath the ground 90 at the transfer station site 86, and the results recorded.

Figure 13:
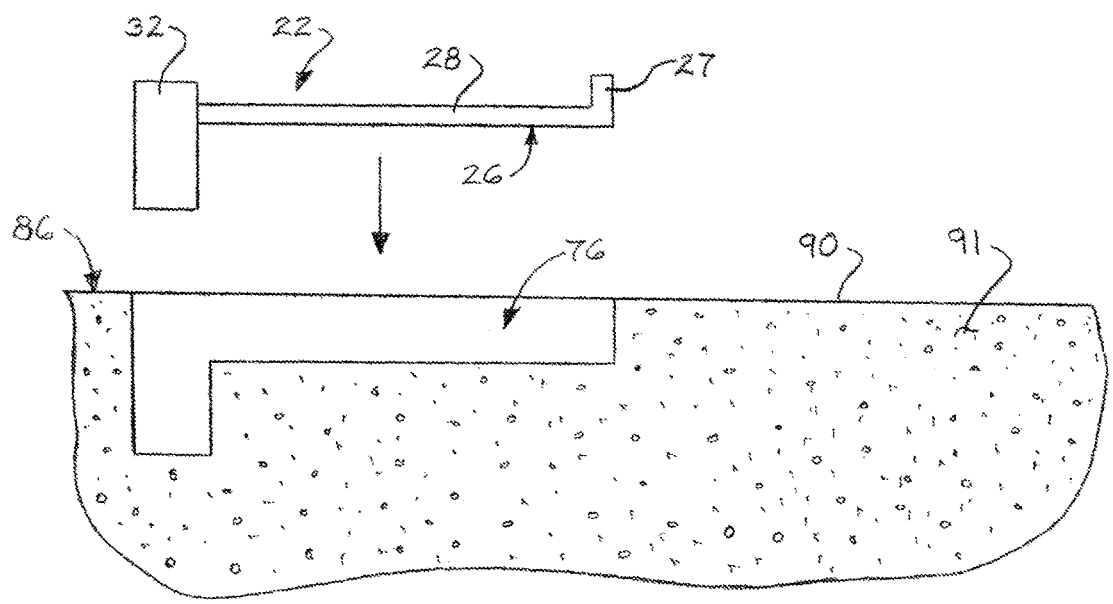
Figure 14:
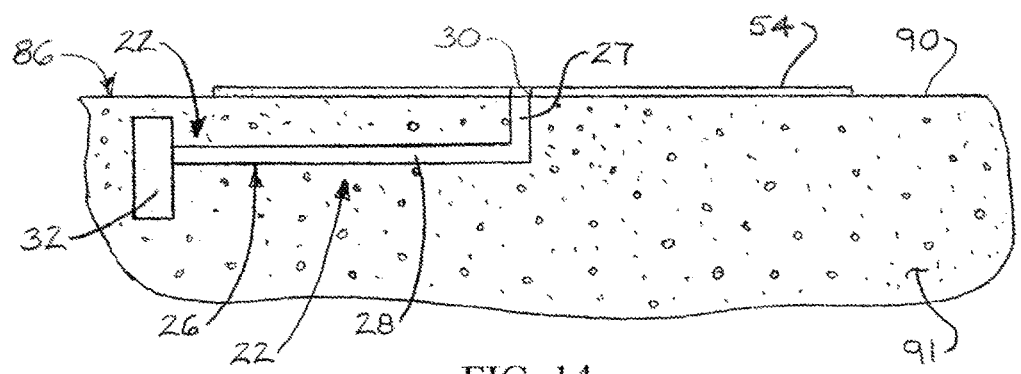

As illustrated in FIG. 13, in some embodiments, a drainage system excavation 76 may be formed in the ground 90 at the transfer station site 86. The drainage system 26 may be assembled or placed in the drainage system excavation 76 and the dislodged soil 91 replaced in the drainage system excavation 76 to cover the drainage system 22. As illustrated in FIG. 14, the waterproof layer 54 may next be deployed in place on the ground 90 typically over the drainage system 22. At least one drain opening 30 may be cut or otherwise formed through the waterproof layer 54 at the drain conduit 26 of the drainage system 22.

Figure 15:
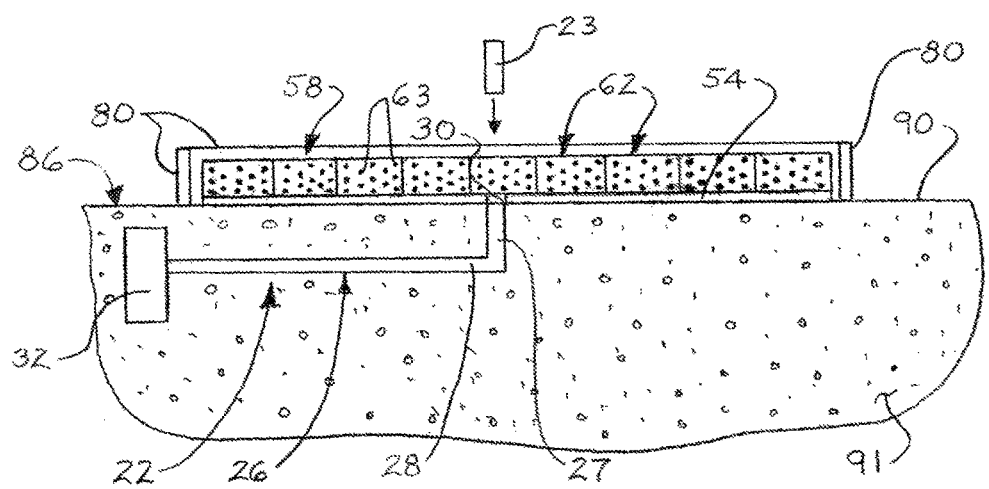
Figure 16:
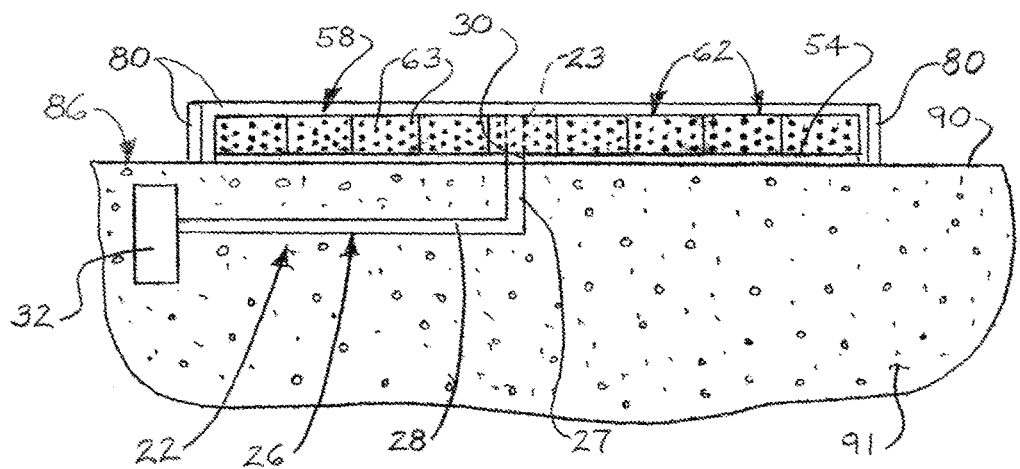

As illustrated in FIGS. 15 and 16, the layer support frame 58 may next be deployed in place on the waterproof layer 54. In some embodiments, this may be accomplished by assembling the cellular confinement system, as was heretofore described with respect to FIGS. 9A and 9B. A slab retainer frame 80 may be assembled around and in spaced-apart relationship to the layer support frame 58. In some applications, the slab retainer frame 80 may include 2×8 members which may be placed around and in spaced-apart relationship to the perimeter of the layer support frame 58. As illustrated in FIG. 15, at least one drain sleeve 23 may be extended through the layer support frame 58 and through the underlying drain opening 30 which extends through the waterproof layer 54.

Figure 17:
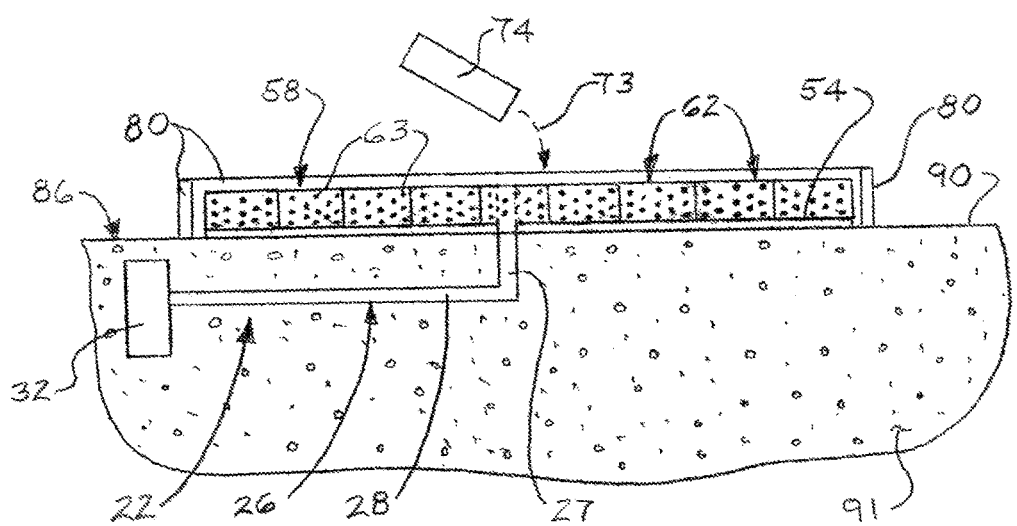

As illustrated in FIG. 17, the controlled low strength material 73 may next be prepared and placed in a suitable dispensing container 74. The controlled low strength material 73 may then be dispensed from the dispensing container 74 onto the layer support frame 58. In some embodiments, the controlled low strength material 73 may be poured into the cell interiors 66 of the system cells 62, as was heretofore described with respect to FIG. 9C. Accordingly, the controlled low strength material 73 may self-level and evenly distribute throughout the length and width or area of the layer support frame 58 by flowing among the cell interiors 66 of the system cells 62 through the cell openings 63 in the system strips 60 which form the cell walls of the adjacent system cells 62.

The controlled low strength material 73 may be poured in the spaces between the slab retainer frame 80 and the layer support frame 58 to form the side slab surfaces 5 of the transfer station slab 2. In some embodiments, additional controlled low strength material 73 may be poured around the perimeter of the layer support frame 58 inside the slab retainer frame 80 to form the slab lip 10 around the perimeter of the transfer station slab 2. After pouring is complete, the controlled low strength material 73 may be allowed to cure or harden to form the transfer station slab 2.

Figure 18:
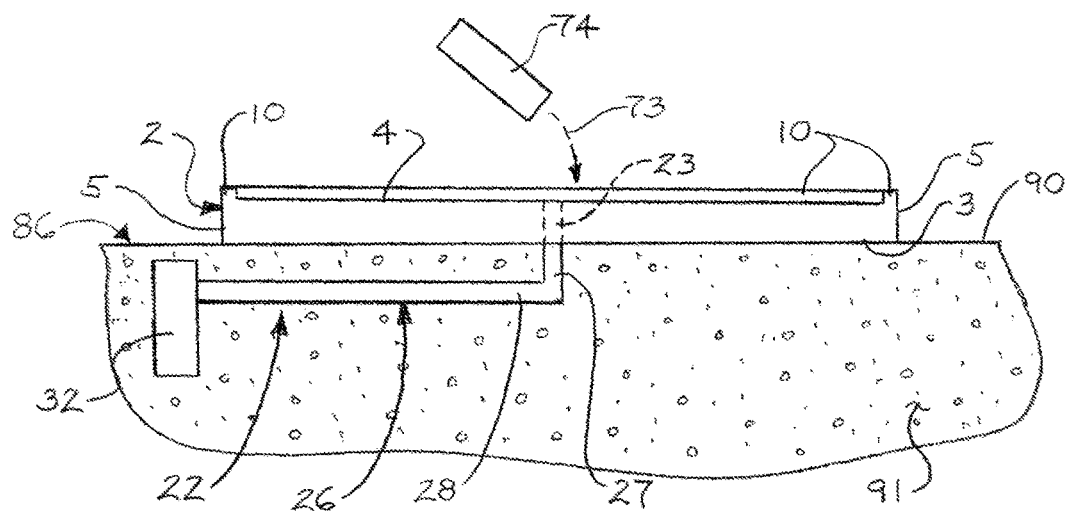
Figure 19:
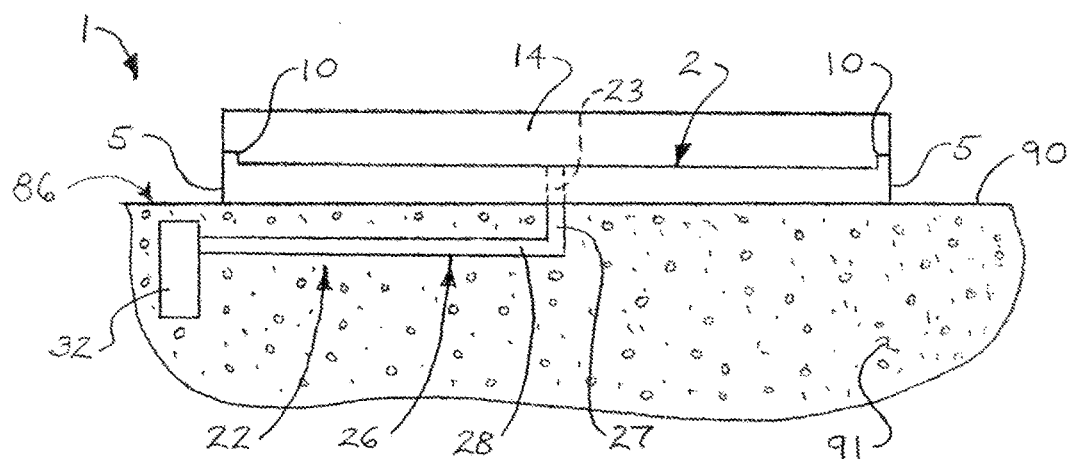

As illustrated in FIGS. 18 and 19, after the controlled low strength material 73 hardens or cures to form the transfer station slab 2, the slab frame 80 may be removed from the respective side slab surfaces 5 of the transfer station slab 2. At least one push wall 14 may be formed by pouring additional controlled low strength material 73 on the transfer station slab 2 typically along at least one of the side slab surfaces 5 and allowed to harden or cure. In some applications, a wall retaining frame or structure (not illustrated) may be provided on and/or adjacent to the transfer station slab 2 to support the push wall 14 as the controlled low strength material 73 is poured and hardens or cures.

Referring again to FIGS. 1, 20 and 21 of the drawings, in typical application, at least one temporary transfer station 1 may be deployed on at least one transfer station site 86 within at least one geographical area 100 having at least one damaged area. The damaged area may have been caused by a natural disaster such as an earthquake, tornado, hurricane and/or flood, for example and without limitation. A non-limiting example of a geographical area 100 which may be suitable for implementation of the temporary transfer stations 1 is illustrated in FIG. 21. The geographical area 100 may include at least one municipality having one or more residential areas 101, 102, 103 and 104, respectively, and/or one or more commercial areas 111, 112, 113 and 114, respectively. At least one downtown area 126 may be centrally-located with respect to the residential areas 101, 102, 103 and 104 and/or the commercial areas 111, 112, 113 and 114. At least one landfill 121, 122 within or in proximity to the geographical area 100 may serve the waste disposal needs of the geographical area 100.

In the event of a widespread disaster which affects substantially all areas of the municipal geographical area 100, a first temporary transfer station 1a may be deployed in proximity to the first residential area 101, the fourth commercial area 114 and the downtown area 126. A second temporary transfer station 1b may be deployed in proximity to the first commercial area 111, the second residential area 102 and the downtown area 126. A third temporary transfer station 1c may be deployed in proximity to the third residential area 103, the third commercial area 113 and the downtown area 126. A fourth temporary transfer station 1d may be deployed in proximity to the fourth residential area 104, the second commercial area 112 and the downtown area 126.

Each temporary transfer station 1a-1d may be fabricated on the ground 90 at the corresponding transfer station site 86 typically in the manner which was heretofore described with respect to FIGS. 12-19. Prior to deployment, at least one preliminary soil sample may be obtained at each transfer station site 86 and tested to detect the presence of any contaminants in the soil 91 and recorded. As was heretofore described with respect to FIG. 1, in some applications, at least one fence 36 may be erected on the ground 90 around the transfer station slab 2 of each temporary transfer station 1. At least one camera 42 may be mounted on a camera post 40 on or adjacent to the fence 36 to record video of the debris loading and unloading operations at the temporary transfer station 1. At least one informational sign 44 may be provided on or inside the fence 36. At least one white goods area 46 may be designated on the top slab surface 4 of the transfer station slab 2. At least one hazardous waste container 48 may be placed on the top slab surface 4 to receive hazardous wastes. At least one skid steer 50 may be placed on the top slab surface 4 to facilitate movement of the debris 94 on the top slab surface 4 and loading of the debris 94 from the transfer station slab 2 into a dump truck or other transport vehicle for transport of the debris 94 to one of the landfills 121.

Determinations regarding number and locations of the temporary transfer stations 1 in the geographical area 100, as well as which temporary transfer stations 1 receive debris 94 from which damaged areas in the geographical area 100, may be determined by proximity of the damaged areas to and ease of access between the damaged areas and the temporary transfer stations 1. For example and without limitation, debris 94 may be transported to the first temporary transfer station 1a from damaged areas in the first residential area 101, the fourth commercial area 114 and/or the downtown area 126. In like manner, debris 94 may be transported to the second temporary transfer station 1b from damaged areas in the first commercial area 111, the second residential area 102 and/or the downtown area 126. Debris 94 may be transported to the third temporary transfer station 1c from damaged areas in the third residential area 103, the third commercial area 113 and/or the downtown area 126, and to the fourth temporary transfer station 1d from damaged areas in the second commercial area 112, the fourth commercial area 104 and/or the downtown area 126. The debris 94 may be transported from each damaged area and loaded onto the transfer station slab 2 of the corresponding temporary transfer station 1 in dump trucks and/or other suitable transport vehicles. White goods may be placed in the white goods area 46 on the transfer station slab 2 for subsequent transportation and recycling or other disposal.

Hazardous wastes may be placed in the hazardous waste container 48 for ultimate disposal.

After each temporary transfer station 1 has been filled to capacity, the debris 94 may be unloaded from the temporary transfer station 1 and transported on dump trucks or other suitable transport vehicles (not illustrated) to the corresponding landfill 121, 122 which is typically in closest proximity to the temporary transfer station 1. Accordingly, as illustrated in FIG. 20, the skid steer 50 may be operated to scrape the skid steer bucket 51 against the top slab surface 4 of the transfer station slab 2 and push the debris 94 against the push wall 14 to facilitate maximum loading of the debris 94 into the skid steer bucket 51 of the skid steer 50. The waterproof layer 54 (FIGS. 7 and 8) of the transfer station slab 2 may prevent liquid from the debris 94 from leeching into the underlying soil 91 at the transfer station site 86. The liquid may instead flow from the top slab surface 4 through the drain opening 18 in the transfer station slab 2 and through the drain conduit 26 and into the holding tank 32 of the drainage system 22. The pump 34 may be operated to pump the liquid through the drain conduit 26 into the holding tank 32.

After unloading of the debris 94 from the transfer station slab 2 is completed, the top slab surface 4 may be sprayed to wash the liquid from the transfer station slab 2 as the effluent flows through the drain opening 18 into the drainage system 22. Additional debris 94 may be sequentially loaded onto the transfer station slab 2 and then unloaded and transported to the corresponding landfill 121, 122, and the procedure repeated until the debris is removed from the damaged area or areas served by the temporary transfer station 1.

After use, each temporary transfer station 1 may be removed from its corresponding transfer station site 86. Accordingly, the transfer station slab 2 of the temporary transfer station 1 may be broken up and excavated from the ground 86 typically using the skid steers 50, backhoes, earth-moving equipment or the like. The drainage system 22 may be excavated and removed from the ground 86, after which the soil 91 may be replaced. Liquid may be removed from the holding tank 32 of the drainage system 22 and placed in a suitable disposal container or facility (not illustrated). In some applications, the components of the temporary transfer station 1, including the transfer station slab 2 and the drainage system 22, may be transported to one of the landfills 121, 122 for ultimate disposal. Alternatively, these components may be recycled for re-use.

After removal of the temporary transfer station 1, at least one final soil sample may be obtained from the soil 91 at each transfer station site 86, tested for the presence of contaminants and recorded. It will be appreciated by those skilled in the art that the final soil samples may reveal the absence of contaminants which may otherwise have leaked or leeched with the liquid from the debris 94 into the underlying soil 91 at the transfer station site 86 since the waterproof layer 54 in the transfer station slab 2 typically provides a liquid-impenetrable barrier to the liquids on the transfer station slab 2 and the drainage system 22 typically collects all the liquid which may drain from the debris 94 onto the top slab surface 4. The temporary transfer stations 1 may thus be deployed, used and removed without any environmental impart to the geographical area 100.

Figure 22:
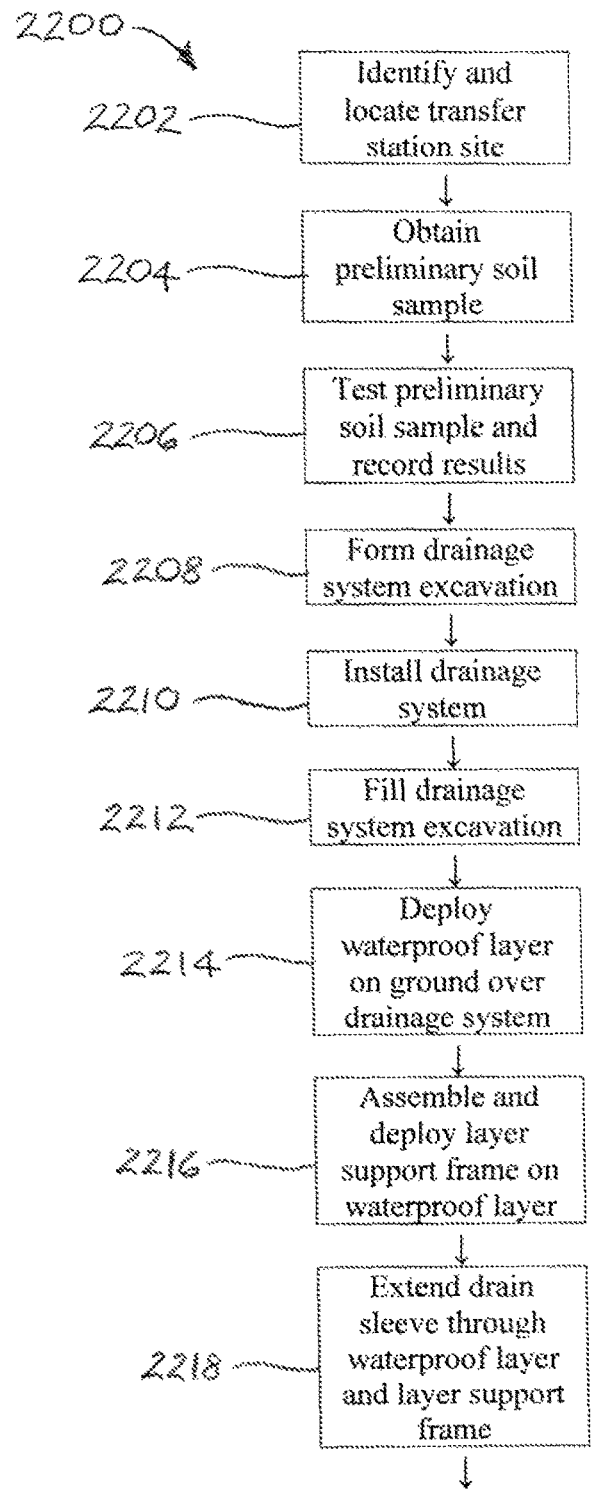
FIG. 22 is a flow diagram of a typical method of fabrication of a temporary transfer station according to some illustrative embodiments of the temporary transfer stations and methods of fabrication and use thereof.
Figure 22:
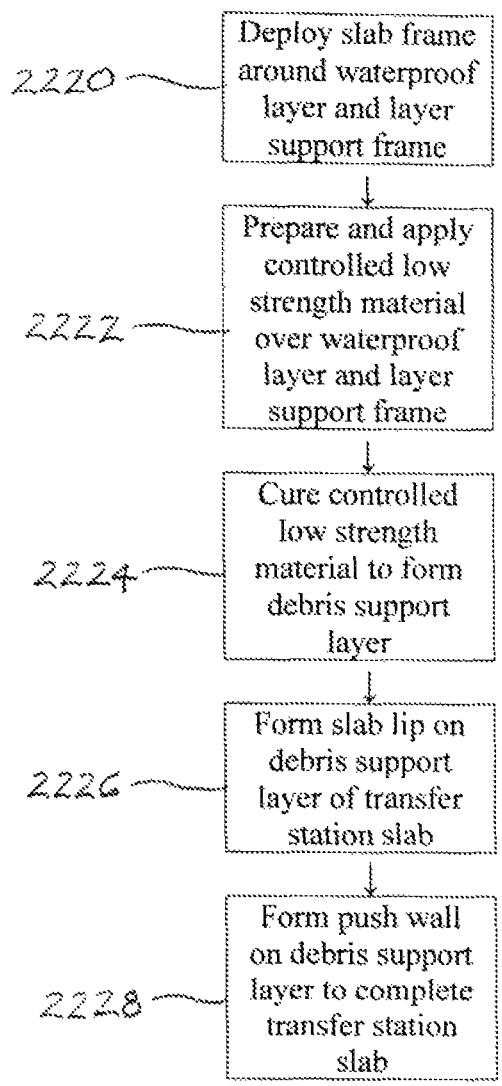

Referring next to FIG. 22 of the drawings, a flow diagram 2200 of a typical method of fabrication of a temporary transfer station according to some illustrative embodiments of the temporary transfer stations and methods of fabrication and use thereof is illustrated. At Step 2202, at least one transfer station site may be identified and located. At Step 2204, at least one preliminary soil sample may be obtained at the transfer station site. At Step 2206, the preliminary soil sample may be tested for soil contaminants and the results recorded. At Step 2208, at least one drainage system excavation may be formed in the ground at the transfer station site. At Step 2210, at least one drainage system may be installed in the drainage system excavation. At Step 2212, the drainage system excavation may be filled.

At Step 2214, at least one waterproof layer may be deployed on the ground over the drainage system. At Step 2216, at least one layer support frame may be assembled and deployed on the waterproof layer. In some embodiments, the layer support frame may include at least one cellular confinement system layer. At Step 2218, at least one drain sleeve may be extended through the waterproof layer and the layer support frame.

At Step 2220, at least one slab retainer frame may be assembled and deployed around the waterproof layer and the layer support frame. At Step 2222, at least one controlled low strength material (CLSM) may be prepared and applied over the waterproof layer and the layer support frame and within the slab retainer frame. At Step 2224, the controlled low strength material may be allowed to cure or harden to complete the transfer station slab having the debris support layer on the layer support frame.

At 2226, at least one slab lip may be formed in the debris support layer around the perimeter of the transfer station slab. At Step 2228, at least one push wall may be formed in the debris support layer along at least one side slab surface of the transfer station slab.

Figure 23:
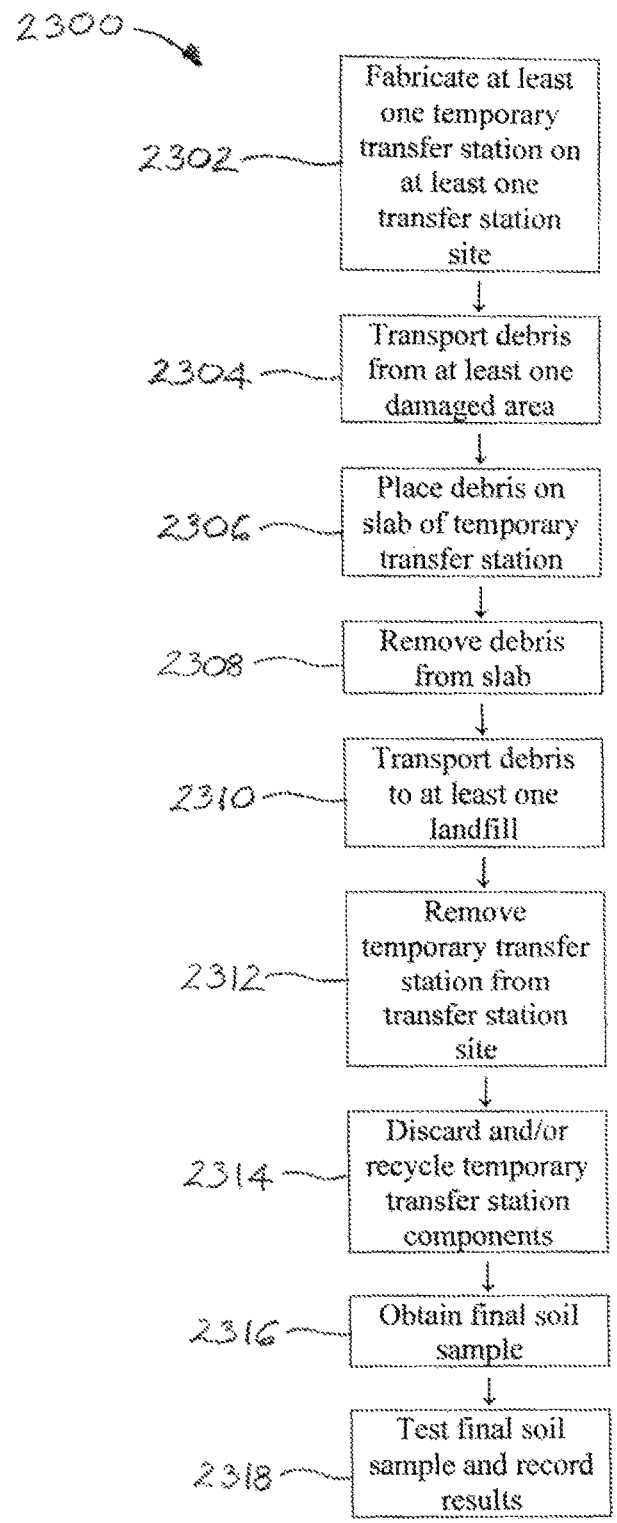
FIG. 23 is a flow diagram of a typical method of fabrication and use of a temporary transfer station according to some illustrative embodiments of the temporary transfer stations and methods of fabrication and use thereof.

Referring next to FIG. 23 of the drawings, a flow diagram 2300 of a typical method of fabrication and use of a temporary transfer station according to some illustrative embodiments of the temporary transfer stations and methods of fabrication and use thereof is illustrated. At Step 2302, at least one temporary transfer station may be fabricated on at least one transfer station site. This may be carried out as was heretofore described with respect to Steps 2202-2228 in FIG. 22. At Step 2304, debris may be transported from at least one damaged area to the temporary transfer station. At Step 2306, the debris may be placed on the transfer station slab of the temporary transfer station.

At Step 2308, the debris may be removed from the temporary transfer station slab. At Step 2310, the debris may be transported from the temporary transfer station to at least one landfill. At Step 2312, the temporary transfer station may be removed from the transfer station site after use. At Step 2314, the components of the temporary transfer station may be discarded and/or recycled. At Step 2316, at least one final soil sample may be obtained from the soil at the transfer station site. At Step 2318, the final soil sample may be tested for the presence of soil contaminants. Accordingly, the temporary transfer station may prevent leaking or leeching of contaminants from liquid on the debris into the underlying soil at the transfer station site to prevent adverse environmental impact to the transfer station site.

It will be appreciated by those skilled in the art that the temporary transfer stations and methods of fabrication and use thereof according to the disclosure facilitate timely, orderly and efficient distribution of debris from damaged areas, such as areas affected by natural disasters, to landfills, particularly in geographical areas impacted by widespread natural disasters. The temporary transfer stations are highly-customizable in size and shape to accommodate transfer station sites having a variety of areal, spatial and other constraints. In some embodiments, the temporary transfer stations may be fabricated of recyclable materials to facilitate repeated fabrication and use of the temporary transfer stations. In some applications, accessibility between the damaged area or areas and each temporary transfer station may be facilitated by constructing a paved access road or path such as by laying the cellular confinement system on the ground and pouring the controlled low strength material over the cellular confinement system. Upon conclusion of the cleanup operation, the paved access road can be removed and its components recycled for re-use along with the components of the temporary transfer stations, typically as was heretofore described.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A temporary transfer station for facilitating distribution of debris from at least one damaged area to at least one landfill, comprising:
    at least one excavatable transfer station slab including:
        at least one waterproof layer;
        at least one layer support frame on the at least one waterproof layer, the at least one layer support frame including at least one cellular confinement system having a plurality of interconnected system cells; and
        at least one debris support layer on the at least one layer support frame, the at least one debris support layer having at least one curable and harden-able controlled low strength material within the plurality of interconnected system cells of the at least one cellular confinement system.

2. The temporary transfer station of claim 1 further comprising at least one push wall extending from the at least one debris support layer of the at least one transfer station slab.

3. The temporary transfer station of claim 1 further comprising at least one slab lip extending from the at least one debris support layer.

4. The temporary transfer station of claim 1 further comprising at least one drain opening in the at least one transfer station slab and at least one drainage system disposed in fluid communication with the at least one drain opening.

5. The temporary transfer station of claim 4 wherein the at least one drainage system comprises a drain sleeve extending through the transfer station slab in fluid communication with the at least one drain opening, a drain conduit disposed in fluid communication with the drain sleeve and at least one holding tank disposed in fluid communication with the drain conduit.

6. The temporary transfer station of claim 5 further comprising at least one pump in the drainage system to facilitate pumping of liquid drained from the at least one transfer station slab through the drain conduit into the at least one holding tank.

7. The temporary transfer station of claim 1 wherein the at least one controlled low strength material has a compressive strength range of from about 30 psi to about 200 psi.

8. A temporary transfer station for deployment on the ground at a transfer station site to facilitate distribution of debris from at least one damaged area to at least one landfill, comprising:
    at least one excavatable transfer station slab having a bottom slab surface configured to rest on the ground at the transfer station site, a top slab surface configured to support the debris and at least one side slab surface and including:
        at least one waterproof layer;
        at least one layer support frame on the at least one waterproof layer, the at least one layer support frame including at least one cellular confinement system having a plurality of interconnected system cells; and
        at least one debris support layer on the at least one layer support frame, the at least one debris support layer having at least one curable and harden-able controlled low strength material within the plurality of interconnected system cells of the at least one cellular confinement system, the side slab surface corresponding to an outer edge or surface of the at least one debris support layer.

9. The temporary transfer station of claim 8 further comprising at least one push wall extending from the at least one debris support layer of the at least one transfer station slab along at least a portion of the at least one side slab surface.

10. The temporary transfer station of claim 8 further comprising at least one slab lip extending from the at least one debris support layer, the at least one slab lip follows a perimeter of the at least one transfer station slab at the at least one side slab surface.

11. The temporary transfer station of claim 8 further comprising at least one drain opening in the at least one transfer station slab and at least one drainage system disposed in fluid communication with the at least one drain opening.

12. The temporary transfer station of claim 11 wherein the at least one drainage system comprises a drain sleeve extending through the transfer station slab in fluid communication with the at least one drain opening, a drain conduit disposed in fluid communication with the drain sleeve and at least one holding tank disposed in fluid communication with the drain conduit.

13. The temporary transfer station of claim 12 further comprising at least one pump in the drainage system to facilitate pumping of liquid drained from the at least one transfer station slab through the drain conduit into the at least one holding tank.

14. The temporary transfer station of claim 8 wherein the at least one controlled low strength material has a compressive strength range of from about 30 psi to about 200 psi to facilitate excavation and removal of the at least one excavatable transfer station slab from the transfer station site after use of the temporary transfer station.

15. A temporary transfer station for deployment on the ground at a transfer station site to facilitate distribution of debris from at least one damaged area to at least one landfill, comprising:
    at least one excavatable transfer station slab having a bottom slab surface configured to rest on the ground at the transfer station site, a top slab surface configured to support the debris and at least one side slab surface and including:
        at least one waterproof layer;
        at least one layer support frame on the at least one waterproof layer, the at least one layer support frame having at least one cellular confinement system including a plurality of interconnected system cells each having a cell interior;
        at least one debris support layer on the at least one layer support frame, the at least one debris support layer having at least one curable and harden-able controlled low strength material in the cell interior of each of the plurality of interconnected system cells, the side slab surface corresponding to an outer edge or surface of the at least one debris support layer;

the at least one controlled low strength material has a compressive strength range of from about 30 psi to about 200 psi to facilitate excavation and removal of the at least one excavatable transfer station slab from the transfer station site after use of the temporary transfer station;

at least one push wall extending from the at least one debris support layer of the at least one transfer station slab along at least a portion of the at least one side slab surface; and at least one slab lip extending from the at least one debris support layer, the at least one slab lip follows a perimeter of the at least one transfer station slab at the at least one side slab surface;

at least one drain opening in the at least one transfer station slab; and at least one drainage system disposed in fluid communication with the at least one drain opening.

16. The temporary transfer station of claim 15 wherein the at least one drainage system comprises a drain sleeve extending through the transfer station slab in fluid communication with the at least one drain opening, a drain conduit disposed in fluid communication with the drain sleeve and at least one holding tank disposed in fluid communication with the drain conduit.

17. The temporary transfer station of claim 16 further comprising at least one pump in the drainage system to facilitate pumping of liquid drained from the at least one transfer station slab through the drain conduit into the at least one holding tank.

18. The temporary transfer station of claim 16 wherein the drain conduit comprises a vertical proximal conduit segment communicating with the drain sleeve and a horizontal distal conduit segment extending from the proximal conduit segment to the at least one holding tank.

* * * * *